US012526056B2

(12) United States Patent
Wen et al.

(10) Patent No.: US 12,526,056 B2
(45) Date of Patent: Jan. 13, 2026

(54) APPARATUS AND METHODS FOR MITIGATING MULTIPATH INTERFERENCE IN FIBER TRANSMISSION SYSTEM

(71) Applicant: Huawei Technologies Co., Ltd., Guandong (CN)

(72) Inventors: Yangjing Wen, Cupertino, CA (US); Yan Cui, Sunnyvale, CA (US); YuSheng Bai, Los Altos Hills, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 151 days.

(21) Appl. No.: 18/153,217

(22) Filed: Jan. 11, 2023

(65) Prior Publication Data

US 2023/0188220 A1 Jun. 15, 2023

Related U.S. Application Data

(63) Continuation of application No. PCT/US2020/042209, filed on Jul. 15, 2020.

(51) Int. Cl.
*H04B 10/69* (2013.01)
*H04B 10/2507* (2013.01)
*H04B 10/61* (2013.01)
*H04B 10/63* (2013.01)

(52) U.S. Cl.
CPC ... *H04B 10/6972* (2013.01); *H04B 10/25073* (2013.01); *H04B 10/6166* (2013.01); *H04B 10/63* (2013.01)

(58) Field of Classification Search
CPC ............... H04B 10/63; H04B 10/6166; H04B 10/25073; H04B 10/6972
See application file for complete search history.

(56) References Cited

U.S. PATENT DOCUMENTS

| | | | |
|---|---|---|---|
| 2003/0169427 A1* | 9/2003 | Muro | H04B 10/503 356/450 |
| 2009/0267704 A1* | 10/2009 | Chang | H05K 1/0233 333/175 |
| 2012/0141122 A1 | 6/2012 | Carusone et al. | |

(Continued)

FOREIGN PATENT DOCUMENTS

| | | | | |
|---|---|---|---|---|
| CN | 102064890 A | | 5/2011 | |
| KR | 20130085455 A | * | 7/2013 | .......... H04J 14/0227 |
| WO | 2011003481 A1 | | 1/2011 | |

OTHER PUBLICATIONS

Allelectronics, "All Electronics Circuits", Jun. 9, 2018, "https://allelectronicscircuits.blogspot.com/2010/12/rc-high-pass-filter.html", All pages (Year: 2018).*

(Continued)

*Primary Examiner* — Pranesh K Barua
(74) *Attorney, Agent, or Firm* — Conley Rose, P.C.

(57) ABSTRACT

An optical receiver that includes an input port configured to receive intensity modulated optical signal with multipath interference (MPI); a detector configured to convert the intensity modulated optical signal with multipath interference to an electrical signal; a high pass filter (HPF) configured to filter the electrical signal and suppress carrier-carrier beat noise induced by the MPI to produce a filtered electrical signal; and an output port configured to transmit the filtered electrical signal.

15 Claims, 20 Drawing Sheets

(56) References Cited

U.S. PATENT DOCUMENTS

| | | | | |
|---|---|---|---|---|
| 2012/0321316 A1* | 12/2012 | Presi | ................ | H04B 10/2587 |
| | | | | 398/67 |
| 2014/0308046 A1* | 10/2014 | Bliss | ................ | H04B 10/2507 |
| | | | | 398/147 |
| 2016/0261346 A1* | 9/2016 | Li | ........................ | H04B 10/63 |
| 2017/0230119 A1* | 8/2017 | Smith | ............. | H04B 10/25073 |
| 2019/0229811 A1 | 7/2019 | Gupta et al. | | |
| 2020/0136724 A1 | 4/2020 | Nabavi et al. | | |
| 2020/0204265 A1* | 6/2020 | Geyer | ............... | H04B 10/5161 |

OTHER PUBLICATIONS

Schultz, "Grob's Basic Electronics", Mar. 4, 2016, "https://highered.mheducation.com/sites/0072988215/student_view0/chapter26/chapter_summary.html", 10 edition, Chapter 26 Summary (Year: 2016).*

"IEEE Standard for Ethernet," IEEE Computer Society, Revision of IEEE Std 802.3-2015, 2018, 5600 pages.

Nicholl, G., et al., "Analytic Estimation of MPI Penalty with supporting experimental measurements," Based on Paper W1F.6, Mar. 12, 2014, 23 pages.

Zhu, F., et al., "Technical Feasibility of Single Wavelength 400GbE 2km & 10km PMD," IEEE 802.3bs 400GbE Task Force Interim Meeting, Norfolk, VA May 12-14, 2014, 15 pages.

Way, W., et al., "Revisit MPI Penalties for 400GBASE-FR8/LR8 Links," NeoPhotonics, USA, IEEE802.3bs, Jan. 2016, 16 pages.

Che, D., et al., "160-Gb/s Stokes Vector Direct Detection for Short Reach Optical Communication," Optical Society of America, 2014, 3 pages.

* cited by examiner

APPARATUS AND METHODS FOR MITIGATING MULTIPATH INTERFERENCE IN FIBER TRANSMISSION SYSTEM

CROSS-REFERENCE TO RELATED APPLICATIONS

This application is a continuation of International Patent Application No. PCT/US2020/042209, filed on Jul. 15, 2020 by Futurewei Technologies, Inc., and titled "Apparatus and Methods for Mitigating Multipath Interference in Fiber Transmission System," which is hereby incorporated by reference in its entirety.

TECHNICAL FIELD

The present disclosure relates to network communication, and more specifically to systems and methods for mitigating multipath interference in fiber transmission system.

BACKGROUND

The rapid growth of data center business is driving operators, enterprises, and service providers to rely on Ethernet solutions that provide high speed network communications. The previously deployed 100G Ethernet (100GE) used 4 lanes of 25 GigaBaud (Gbaud) non-return-to-zero (NRZ) modulation formats, either through space division multiplexing with 4 parallel single mode fiber (PSM4) for 500 meters (m), or wavelength division multiplexing (WDM) with 4 channels of Local Area Network (LAN) WDM (LWDM-4) or coarse WDM (CWDM-4) for 2 kilometers (km), 10 km and 40 km reaches. For the 400GE currently being deployed, 4 level pulse amplitude modulation (PAM4) was adopted as the optical modulation format. In Institute of Electrical and Electronics Engineers (IEEE) standards, 50 Gbaud PAM4 PSM4 was used for 500 m, and 8 channel 25 Gbaud (LWDM-8) was used for 2 km and 10 km reaches. In the 100G Lambda multi-source agreement (MSA) industry consortium, 4 channel of 50 Gbaud CWDM-4 PAM4 has also been adopted for 2 km and 10 km to reduce the cost.

SUMMARY

A first aspect relates to an optical receiver that includes an input port configured to receive an intensity modulated optical signal with multipath interference (MPI); a detector configured to convert the intensity modulated optical signal with multipath interference to an electrical signal; a high pass filter (HPF) configured to filter the electrical signal and suppresses low frequency components induced by the MPI to produce a filtered electrical signal; and an output port configured to transmit the filtered electrical signal.

A second aspect relates to a polarization tracking optical receiver that includes a polarization tracker configured to receive the dual polarization signal and demultiplex the dual polarization signal into an X channel optical signal and a Y channel optical signal; a first detector configured to receive the X channel optical signal and convert the X channel optical signal to a first electrical signal; a second detector configured to receive the Y channel optical signal and convert the Y channel optical signal to a second electrical signal; a first high pass filter (HPF) configured to receive the first electrical signal and filter the first electrical signal to suppress low frequency components induced by MPI to produce a first filtered electrical signal; a second HPF configured to receive the second electrical signal and filter the second electrical signal to suppress low frequency components induced by the MPI to produce a second filtered electrical signal; a first output port configured to transmit the first filtered electrical signal; and a second output port configured to transmit the second filtered electrical signal.

A third aspect relates to a polarization tracking self-homodyne detection (SHD) receiver that includes a polarization tracker configured to receive the SP-SHD channel with MPI from the MPI impaired fiber link and separate the SP-SHD channel into the signal and the pilot signal, where the pilot signal is used as a local oscillator (LO); a 90 degree optical hybrid mixer configured to receive the signal and the LO, the 90 degree optical hybrid mixer configured to generate an in-phase (I) positive output signal, I negative output signal, quadrature (Q) positive output signal, and Q negative output signal; a first balanced detector (BD) configured to receive the I positive output signal and the I negative output signal, and recover an I data signal; a second BD configured to receive the Q positive output signal and the Q negative output signal, and recover a Q data signal; the first HPF configured to receive the I data signal and filter the I data signal to suppress low frequency components induced by MPI to produce a first filtered electrical signal; the second HPF configured to receive the Q data signal and filter the Q data signal to suppress the low frequency components induced by the MPI to produce a second filtered electrical signal; a first output port configured to transmit the first filtered electrical signal; and a second output port configured to transmit the second filtered electrical signal.

A fourth aspect relates to a polarization-division multiplexing (PDM) fiber system that includes a dual polarization optical transmitter; a polarization tracking optical receiver with multiple high pass filters (HPFs) for multipath interference (MPI) mitigation; and a fiber link that experiences the MPI, the fiber link coupling the dual polarization optical transmitter and the polarization tracking optical receiver.

A fifth aspect relates to a single polarization (SP) self-homodyne detection (SHD) transmission system that includes a SP-SHD transmitter; a multipath interference (MPI) impaired fiber link; and a polarization (polarization) tracking SHD receiver having a first high pass filter (HPF) and a second HPF for MPI mitigation.

The preceding aspects advantageously remove undesired carrier-carrier beat noise from an optical signal with multipath interference. The beat noise is the undesired crosstalk caused by the beating between the optical signal carrier and MPI carrier. By doing so, the preceding aspects can reduce the impact of MPI in intensity modulation direct detection (IMDD) systems such as, but not limited to, PAMn systems (e.g., PAM4 systems), single polarization IMDD system, polarization division multiplexed IMDD system, and SP-self-homodyne detection (SHD) systems. The preceding aspects can be extremely beneficial in short reach networks and client side optical networks, like intra and inter data centers.

Optionally, in any of the preceding aspects, the HPF has a cut-off frequency in the range of 1 megahertz (MHz) to approximately 100 MHz.

Optionally, in any of the preceding aspects, the HPF has a cut-off frequency in the range of 1 MHz to approximately 200 MHz.

Optionally, in any of the preceding aspects, a ratio of the HPF cut-off frequency to transmitter laser linewidth is in the range of 3 to 200.

Optionally, in any of the preceding aspects, the HPF has a cut-off frequency around 20 MHz.

Optionally, in any of the preceding aspects, a transimpedance amplifier (TIA) is configured to amplify the electrical signal.

Optionally, in any of the preceding aspects, a TIA is located after the HPF and configured to amplify the filtered electrical signal.

Optionally, in any of the preceding aspects, the HPF is a resistor-capacitor (RC) HPF having a surface mount capacitor on a micro-stripe transmission line.

Optionally, in any of the preceding aspects, a frequency transfer function of the HPF is, where is the cut-off frequency.

Optionally, in any of the preceding aspects, the HPF is an existing direct component (DC) block with a replaced capacitor having the cut-off frequency.

Optionally, in any of the preceding aspects, the intensity modulated optical signal with MPI uses pulse amplitude modulation n (PAMn) as a baseband modulation, where n is an integer equal to or greater than two.

Optionally, in any of the preceding aspects, the intensity modulated optical signal with MPI uses one of a carrierless amplitude phase (CAP) modulation, quadrature amplitude modulation (QAM), or discrete multiple tone (DMT) as a subcarrier modulation.

Optionally, in any of the preceding aspects, an optimal cut-off frequency of the HPF increases with an increase of a laser linewidth used in transmitting an intensity modulated optical signal to the optical receiver.

Optionally, in any of the preceding aspects, the MPI is produced in a fiber link coupled to the input port of the optical receiver.

Optionally, in any of the preceding aspects, the HPF introduces a filtering penalty that is dependent on a baud rate used in modulating data in the intensity modulated optical signal received by the optical receiver.

For the purpose of clarity, any one of the foregoing embodiments may be combined with any one or more of the other foregoing embodiments to create a new embodiment within the scope of the present disclosure.

These and other features, and the advantages thereof, will be more clearly understood from the following detailed description taken in conjunction with the accompanying drawings and claims.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
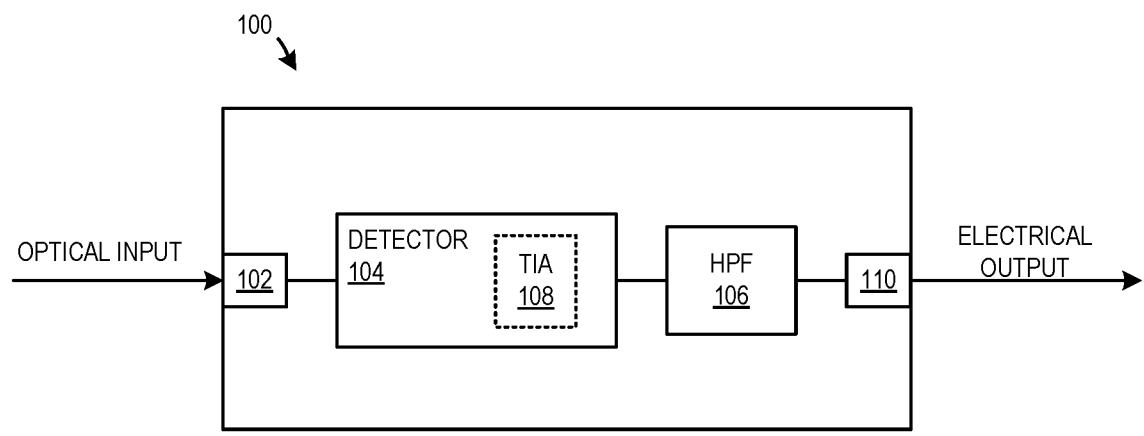
FIG. 1 is a schematic diagram illustrating an optical receiver with a high pass filter (HPF) in accordance with an embodiment of the present disclosure.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Intensity modulated optical signals have a strong optical carrier in addition to broadband data. The carrier spectral width is determined by the laser linewidth and is very narrow compared to data spectral width. MPI is the sum of double reflections of transmitted signals in the fiber link. MPI and signal are combined via superposition in optical field when detected at the optical receiver. After photo-detection, the beating of the optical signal carrier and MPI carrier generates low frequency components, which is undesired crosstalk and hereafter referred as carrier-carrier beat noise. The spectrum of carrier-carrier beat noise is the convolution between the signal carrier and MPI carrier. Its spectral profile is determined by the laser linewidth and the delay between the signal and MPI. For a typical electro-absorption modulated laser (EML) with a few MHz linewidth, the spectral width of fully de-correlated carrier-carrier beat noise is about twice the laser linewidth, which is still very narrow compared to the data spectrum that goes up to tens of GHz.

For the next generation 800GE, PAM4 (either single polarization or polarization multiplexed) or self-homodyne detection (SHD) may be promising solutions due to their low complexity and being easier to upgrade from 400GE. However, PAM4 is very susceptible to MPI caused by fiber connector reflectance. For example, client side optical networks involve multiple reflection points originating from fiber connectors, transmitter, and receiver. These reflectance points generate MPI, particularly when connectors are dirty. In practical deployment, low MPI tolerance is a major limitation of direct detected PAM4 applications. In order to accommodate PAM4 applications, the standards bodies like IEEE802.3 and 100 G Lambda MSA tightened the fiber connector return loss (RL) specification from −26 decibels (dB) to −35 dB in 2016. But in real systems, return loss from "dirty connectors" (e.g., Standard/Subscriber Connector (SC) connector or ferrule connector (FC)) can be well above −26 dB, making it hard to use PAM4 format. In particular, in short reach fiber transmission systems, like data centers, MPI has been a major limitation in performance.

Accordingly, the disclosed embodiments include a new optical receiver configuration having at least one high pass filter (HPF) to remove the low frequency carrier-carrier beat noise in order to mitigate the impact of fiber link MPI. By doing so, the disclosed embodiments can reduce the impact of MPI in IMDD systems such as, but not limited to, PAMn systems, single polarization IMDD system, polarization division multiplexed IMDD system, and SP-SHD systems. The various embodiments include both polarization tracking optical receivers and polarization tracking SHD optical receivers having one or multiple HPFs. The disclosed embodiments can be extremely beneficial in short reach networks and client side optical networks, like intra and inter data centers. The disclosed embodiments provide a simple passive solution that requires no additional power consumption. As will be described herein, theoretical analysis, simulation and experiment were carried out to verify the effectiveness of the disclosed embodiments.

FIG. 1 is a schematic diagram illustrating an optical receiver 100 with a high pass filter in accordance with an embodiment of the present disclosure. The optical receiver 100 includes an input port 102, a detector 104, a HPF 106, and an output port 110. The input port 102 receives an intensity modulated optical signal, possibly combined with MPI. In an embodiment, the detector 104 is a photo-detector (PD) the output of which can be serially connected to an optional transimpedance amplifier (TIA) 108. In an embodiment, the detector 104 receives or detects the optical input signal, converts it to electrical signal via direct detection (envelop detection), and amplifies the electrical signal using the TIA 108. The HPF 106 is operable to remove low frequency carrier-carrier beat noise in order to mitigate the carrier-carrier beat noise caused by the beating between the signal carrier and MPI carrier. In particular, the HPF 106 filters the electrical signal and suppresses low frequency noise generated by the beating between signal carrier and MPI carrier. In an embodiment, the HPF 106 has a cut-off frequency in the range of 1 MHz~100 MHz or 1 MHz~200 MHz. In an embodiment, the electrical output signal of the optical receiver is fed from the output port 110 to either digital signal processor (DSP after analog to digital conversion) or decision circuits.

In an alternative embodiment, the TIA 108 can be separate from the detector 104. The TIA 108 may be in multiple stages, where the first stage converts a photo current from the detector 104 to a voltage source. In some embodiments, the HPF 106 can be located between the detector 104 and the TIA 108.

The optical signal may be in baseband format like multi-level pulse amplitude modulation PAMn, including PAM2 (NRZ), PAM4, or higher level PAM. Here n in PAMn is an integer equal or greater than 2. The optical signal can also be a subcarrier based format like carrierless amplitude phase (CAP) modulation, quadrature amplitude modulation (QAM), or discrete multiple tone (DMT). In a conventional optical receiver, a direct component (DC) block may be already placed after the TIA 108. The DC block may exhibit a high pass filtering aspect, but with a cut-off frequency well below 1 MHz and a typical value ranging from tens of kHz to 100 kHz. Here the HPF cut-off frequency is defined as the frequency at which the output amplitude equals 70.7% of the input amplitude (or at which the response is equal to 50% of the peak response in the HPF transfer function). The frequency range below this cut-off point is generally known as the stop band while the frequency range above this cut-off point is generally known as the pass band. As demonstrated later, this kind of DC block has little or no effect on MPI impact mitigation. In an embodiment, the HPF 106 has a cut-off frequency in the range of 1 MHz to approximately 100 MHz or 1 MHz to approximately 200 MHz, which is different from the conventional DC block.

Figure 2A:
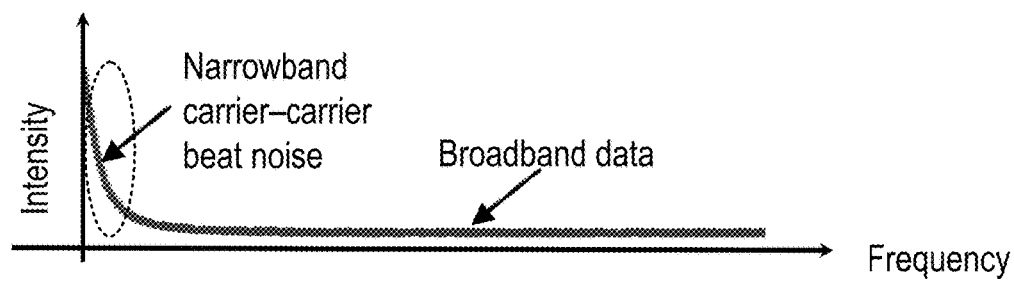
FIGS. 2A-2C are graphs illustrating the schematic principle of the proposed method using a HPF in an optical receiver to mitigate multipath interference (MPI) effect in accordance with an embodiment of the present disclosure.
Figure 2B:
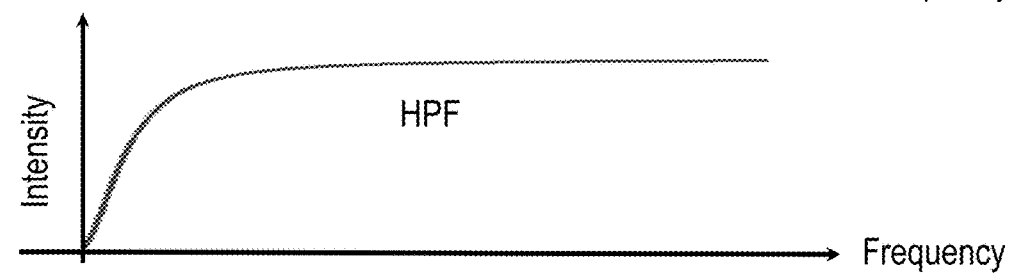
Figure 2C:
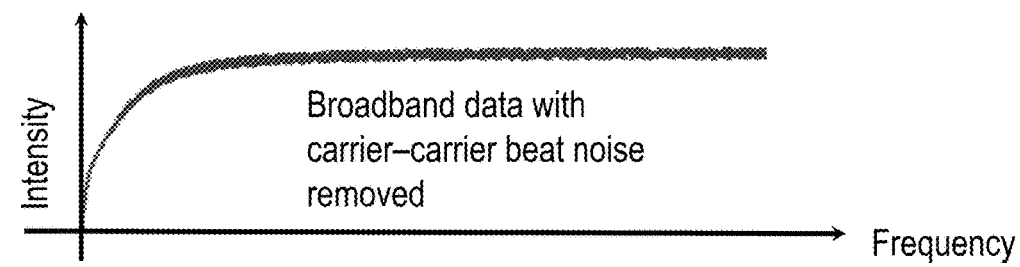

FIGS. 2A-2C are graphs illustrating the schematic principle of the proposed method using a HPF in an optical receiver to mitigate MPI effect in accordance with an embodiment of the present disclosure. FIG. 2A is the electrical spectrum of the HPF input, which is the electrical signal with carrier-carrier beat noise (i.e., the signal going into the HPF 106 in FIG. 1). As shown in FIG. 2A, the signal includes broadband data and low frequency narrow band carrier-carrier beat noise. FIG. 2B is the HPF frequency response, where intensity in the vertical axis is the square of magnitude. Frequency response is the quantitative measure of the output spectrum of the HPF in response to a stimulus. It is a measure of magnitude and phase of the output as a function of frequency, in comparison to the input. FIG. 2C is the spectrum of the HPF output, which is the electrical signal with carrier-carrier beat noise removed by the HPF (i.e., the broadband data with the low frequency narrow band carrier-carrier beat noise removed). FIG. 2 shows that using a HPF, the low frequency narrow band carrier-carrier beat noise caused by the beating between signal carrier and MPI carrier is removed from the broadband data.

Figure 3A:
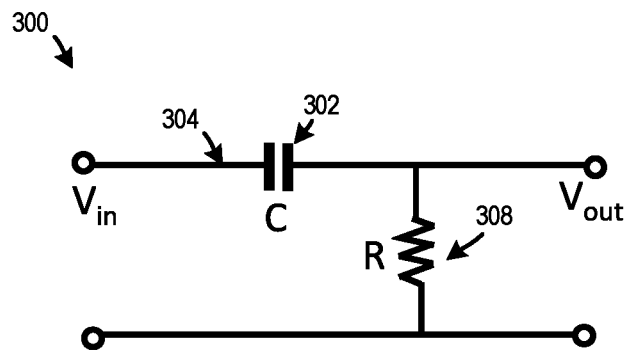
FIG. 3A is a schematic diagram illustrating a configuration of a HPF in accordance with an embodiment of the present disclosure.

FIG. 3A is a schematic diagram illustrating a configuration of a HPF 300 in accordance with an embodiment of the present disclosure. In an embodiment, the HPF 300 is a resistor-capacitor (RC) high pass filter. A surface mount capacitor 302 may be introduced on the micro-stripe transmission line 304. Resistor (R) 308 is the load impedance. In an embodiment, the frequency transfer function of the HPF 300 is $$H(f) = \frac{V_{out}}{V_{in}} = \frac{jf/f_c}{1+jf/f_c} \qquad (1)$$

Where f is the frequency and j is the unit imaginary number, and $$f_C = \frac{1}{2\pi RC} \quad (2)$$

is the cut-off frequency, which occurs at where the response $|H(f_c)|^2$ is 3 dB below its peak.

In an embodiment, the HPF 300 may also be realized by replacing the capacitor of an existing DC block with a much smaller value, according to formula (2) (i.e., a DC block with a replaced capacitor having the cut-off frequency $$f_C = \frac{1}{2\pi RC} \Big).$$

Figure 3B:
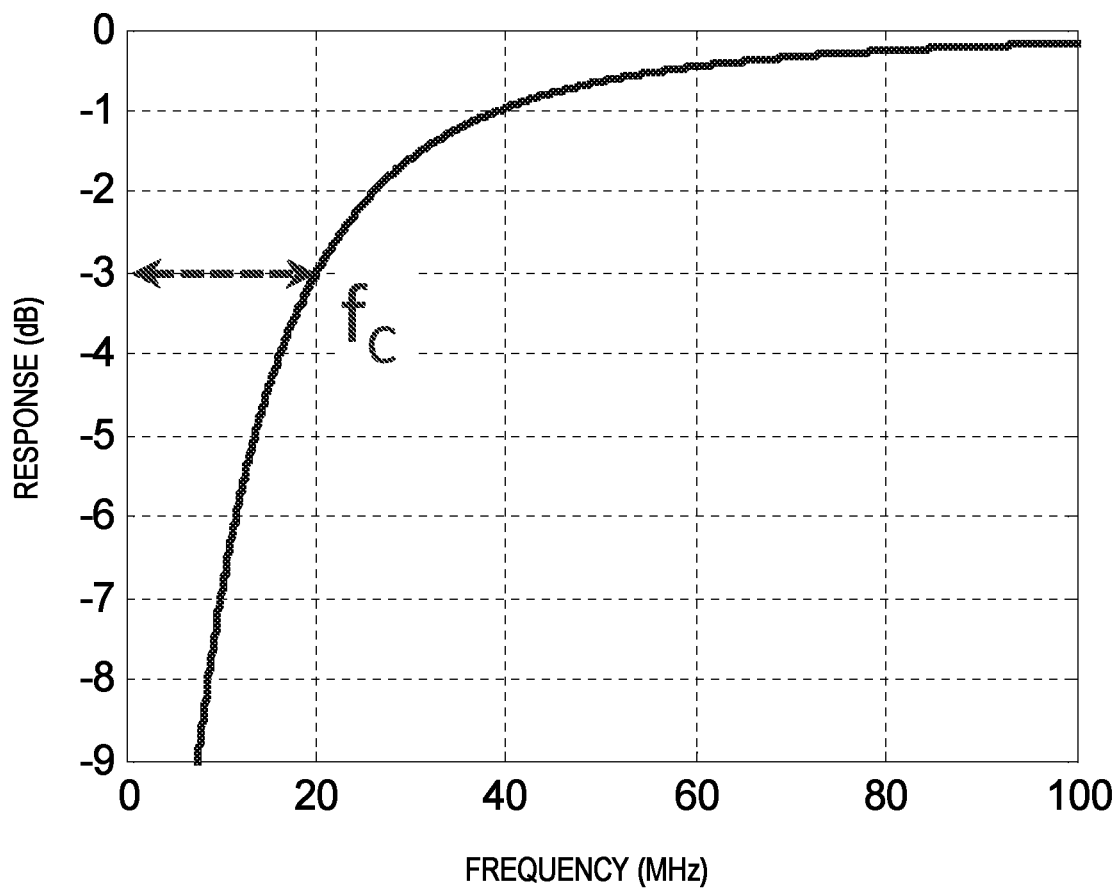
FIG. 3B is a graph illustrating a frequency response of a resistor-capacitor (RC) HPF with a cut-off frequency of 20 megahertz (MHz) in accordance with an embodiment of the present disclosure.

For example, tor a cut-off frequency of 20 megahertz (MHz), the required capacitance is around 160 pF. FIG. 3B is a graph illustrating a frequency response of an RC HPF with a cut-off frequency of 20 MHz ($f_c$=20 MHz) in accordance with an embodiment of the present disclosure.

Figure 4:
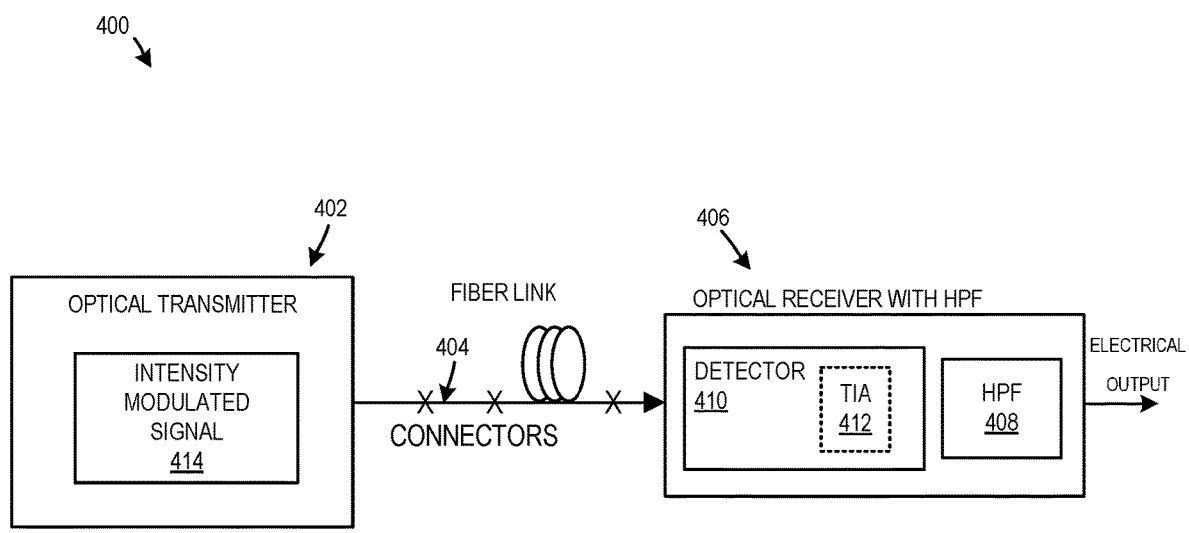
FIG. 4 is a schematic diagram illustrating a fiber transmission system in accordance with an embodiment of the present disclosure.

FIG. 4 is a schematic diagram illustrating a fiber transmission system 400 in accordance with an embodiment of the present disclosure. The fiber transmission system 400 includes of an optical transmitter 402, a fiber link 404 that experiences multipath interference, and an optical receiver 406 with a HPF 408. In an embodiment, the optical receiver 406 is similar to the optical receiver 100 in FIG. 1.

In an embodiment, the optical transmitter 402 generates an intensity modulated optical signal 414 from an electro-absorption modulated laser (EML) or a directly modulated laser (DML). In other embodiments, the optical transmitter 402 generates the intensity modulated optical signal 414 from a continuous wave (CW) laser followed by an intensity modulator like Mach-Zehnder modulator (MZM), where the CW light can be from a distributed feedback laser (DFB) or an external cavity laser (ECL). In an embodiment, the intensity modulated optical signal 414 can use PAMn as a baseband modulation, and CAP, QAM, or DMT as a subcarrier modulation. In an embodiment with subcarrier modulation, if a match filter is used in a receiver DSP then an analog HPF is not needed. The optical transmitter 402 can employ various generation schemes and laser linewidth such as, but not limited to, EML for laser linewidth of a few MHz, DML for laser linewidth up to or above 10 MHz, DFB+ MZM for laser linewidth of a few MHz, and ECL+MZM for laser linewidth in tens of kHz.

The fiber link 404 receives the intensity modulated optical signal 414 from the optical transmitter 402 and sends the signal into the optical receiver 406. The fiber link 404 may consist of one or multiple segment of fibers. The fiber link 404 may have at least two reflectance points, which may be from the transmitter, receiver, or fiber connectors. Double reflection of a forward traveled signal generates a forward traveled reflected light. MPI is the accumulation of all forward traveled reflected lights. The strength of MPI depends on the return loss of connectors, transmitter and receiver, as well as the polarizations alignment, and delay and phase shift between signal and each double reflected light.

As described in FIG. 1, the optical receiver 406 receives and detects the optical signal with MPI, converts the optical signal to an electrical signal using the detector 410, amplifies the electrical signal using the TIA 412, suppresses the carrier-carrier beat noise of the electrical signal using the HPF 408, and outputs data to the next stage for digital signal processing or decision.

For an optical fiber link with MPI events, the worst case occurs when all MPIs have aligned polarization and amplitude, but have de-correlated phase from the signal. The worst case of accumulated MPIs can be modeled by a single equivalent MPI event. The optical field with signal and MPI can be expressed as $$E(t) = E_S(t)e^{\varphi(t)} + \sqrt{\varepsilon}E_{MPI}(t)e^{\varphi(t-\tau)} \quad (3)$$

where e is the equivalent MPI or reflectance, f(t) is the laser phase noise and t is the delay between the signal and MPI.

In order to understand the issue analytically, the optical signal field and MPI field can be simplified as carrier and broadband data for an intensity modulated system. So equation (3) can be written as $$E(t) = \sqrt{P_0}\,[1 + V_S(t)]^{\frac{1}{2}}e^{\varphi(t)} + \sqrt{\varepsilon}\sqrt{P_0}\,[1 + V_{MPI}(t)]^{\frac{1}{2}}e^{\varphi(t-\tau)} \quad (4)$$

where $P_0$ is the average optical power, $V_S(t)$ the modulated broadband data, $V_{MPI}(t)$ is the data part of the MPI. After photo-detection, the photo current $I_{PD}$ can be expressed as $$I_{PD}(t)=\eta|E(t)|^2=\eta P_0[1+V_S(t)]+\varepsilon\eta P_0[1+V_{MPI}(t)]+2\sqrt{\varepsilon}\eta P_0[1+V_S(t)]^{1/2}[1+V_{MPI}(t)]^{1/2}\cos[\varphi(t)-\varphi(t-\tau)]$$

$$I_{PD}(t)=\eta|E(t)|^2=\eta P_0[1+V_S(t)]+\varepsilon\eta P_0[1+V_{MPI}(t)]+2\sqrt{\varepsilon}\eta P_0[1+V_S(t)]^{1/2}[1+V_{MPI}(t)]^{1/2}\cos[\varphi(t)-\varphi(t-\tau)] \quad (5)$$

$$I_{PD}\approx\eta P_0\{[1+V_S(t)]+\varepsilon+2\sqrt{\varepsilon}\cos[\varphi(t)-\varphi(t-\tau)]+\text{broadband crosstalk}\} \quad (6)$$

Here h is the detector responsivity. In the right side of equation (6), the first term "1" is the DC (0 Hz frequency) of signal, the second term $V_S(t)$ is the useful signal; the third term "e" is the MPI induced DC (0 Hz frequency), which can be removed by DC block and does not affect the performance; the $4^{th}$ term $2\sqrt{\varepsilon}\cos[\varphi(t)-\varphi(t-\tau)]$ is the carrier-carrier beat noise (caused by beating between the signal carrier and MPI carrier), and its spectrum is the convolution of f(t) and f(t−t), which is determined by the laser linewidth and delay between the signal and MPI. For widely used optical transmitter consisting of DFB+MZM or EML, the typical laser linewidth is a few MHz. For sufficiently de-correlated phase between the signal and MPI, the spectral width of the carrier-carrier beat noise could be around twice of the laser linewidth, still in the range of MHz. A built-in DC block inside receiver cannot suppress this carrier-carrier beat noise, hence the disclosed embodiments utilizes a HPF filter.

Simulations have been carried out to verify the scheme of the disclosed embodiments, with simulation conditions listed in Table 1.

TABLE 1

| Data | Modulation format | PAM4 |
|---|---|---|
| | Baud rate | 53.2 Gbaud |
| | Pattern | prbs21 |

TABLE 1-continued

| | | |
|---|---|---|
| Transmitter | Data length | 1 million symbols |
| | Tx type | DFB + MZM |
| | Laser linewidth | 1 MHz, also varied to study its impact when stated |
| | Laser RIN | −145 dBc/Hz |
| | Extinction ratio | 6 dB |
| | Tx S21 | 5$^{th}$ order Bessel filter with bandwidth of 0.75 × baudRate |
| Receiver | Responsivity | 0.8 W/A |
| | Rx S21 | 5$^{th}$ order Bessel filter with bandwidth of 0.75 × baudRate |
| | Input current noise density | 20 pA/sqrt(Hz) |
| | HPF | RC high pass filter |

Figure 5A:
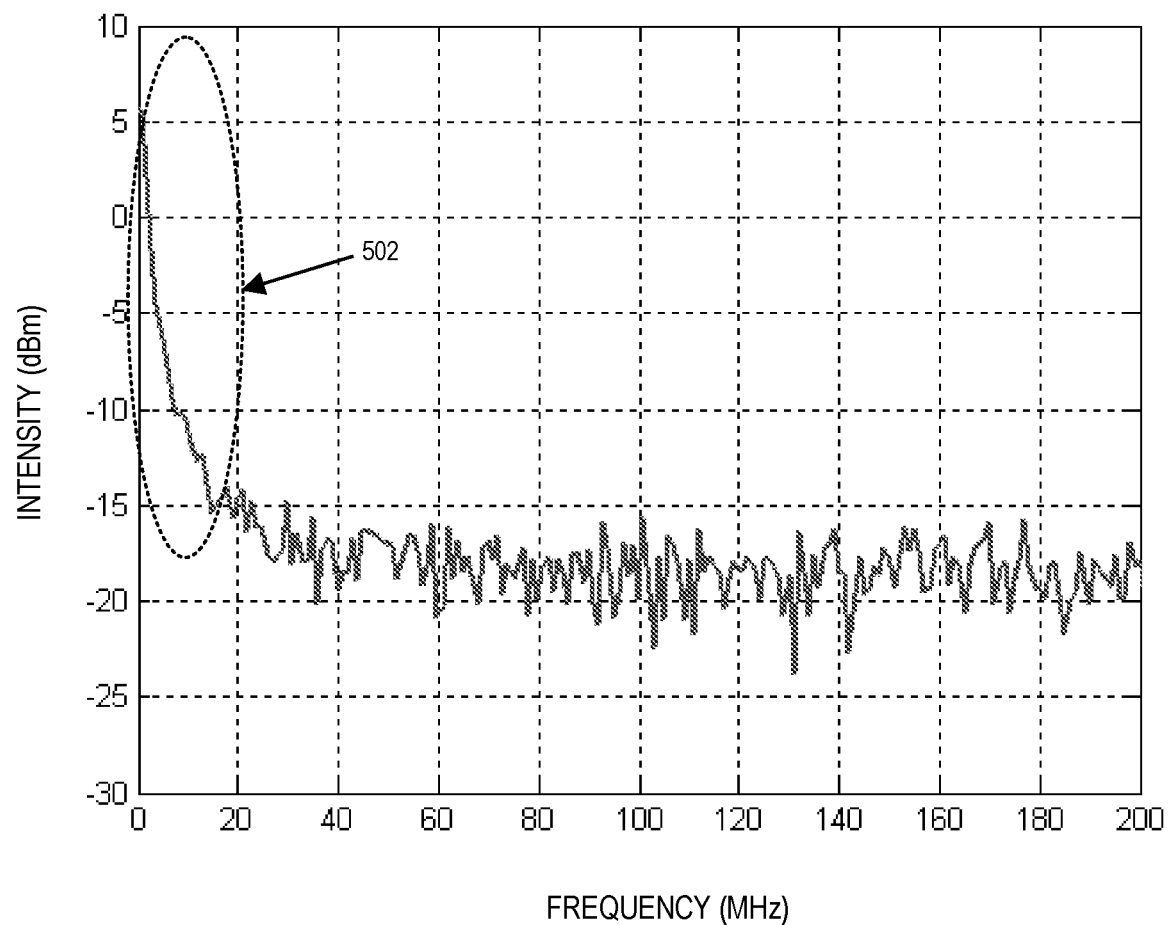
FIG. 5A is a graph illustrating the radio frequency (RF) spectrum of detected signal with −26.5 decibel (dB) equivalent MPI in accordance with an embodiment of the present disclosure.
Figure 5B:
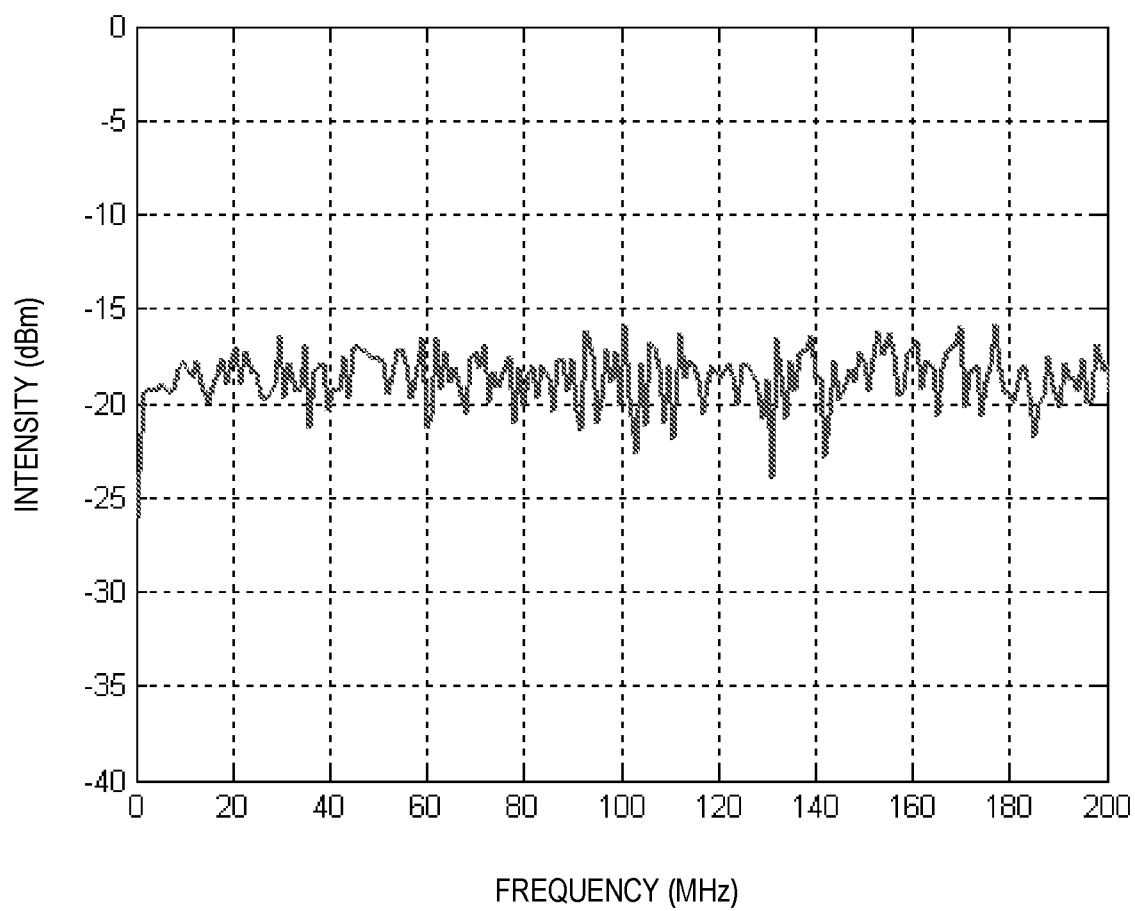
FIG. 5B is a graph illustrating the RF spectrum after a RC HPF with cut-off frequency of 20 MHz is applied to the MPI distorted signal in accordance with an embodiment of the present disclosure.

To verify the schematic principle shown in FIGS. 2A-2C, the received RF spectra is analyzed. FIG. 5A is a graph illustrating the RF spectrum of the detected signal with −26.5 dB equivalent MPI in accordance with an embodiment of the present disclosure. As shown in FIG. 5A, strong low frequency components 502 with a spectral profile close to Lorentz shape are observed, which is due to carrier-carrier beat noise. FIG. 5B is a graph illustrating the RF spectrum after a RC HPF with a cut-off frequency of 20 MHz is applied to the MPI distorted signal in accordance with an embodiment of the present disclosure. As shown in FIG. 5B, after the HPF is applied to the MPI distorted signal, the low frequency components/noises 502 (seen in FIG. 5A) are removed.

Figure 6A:
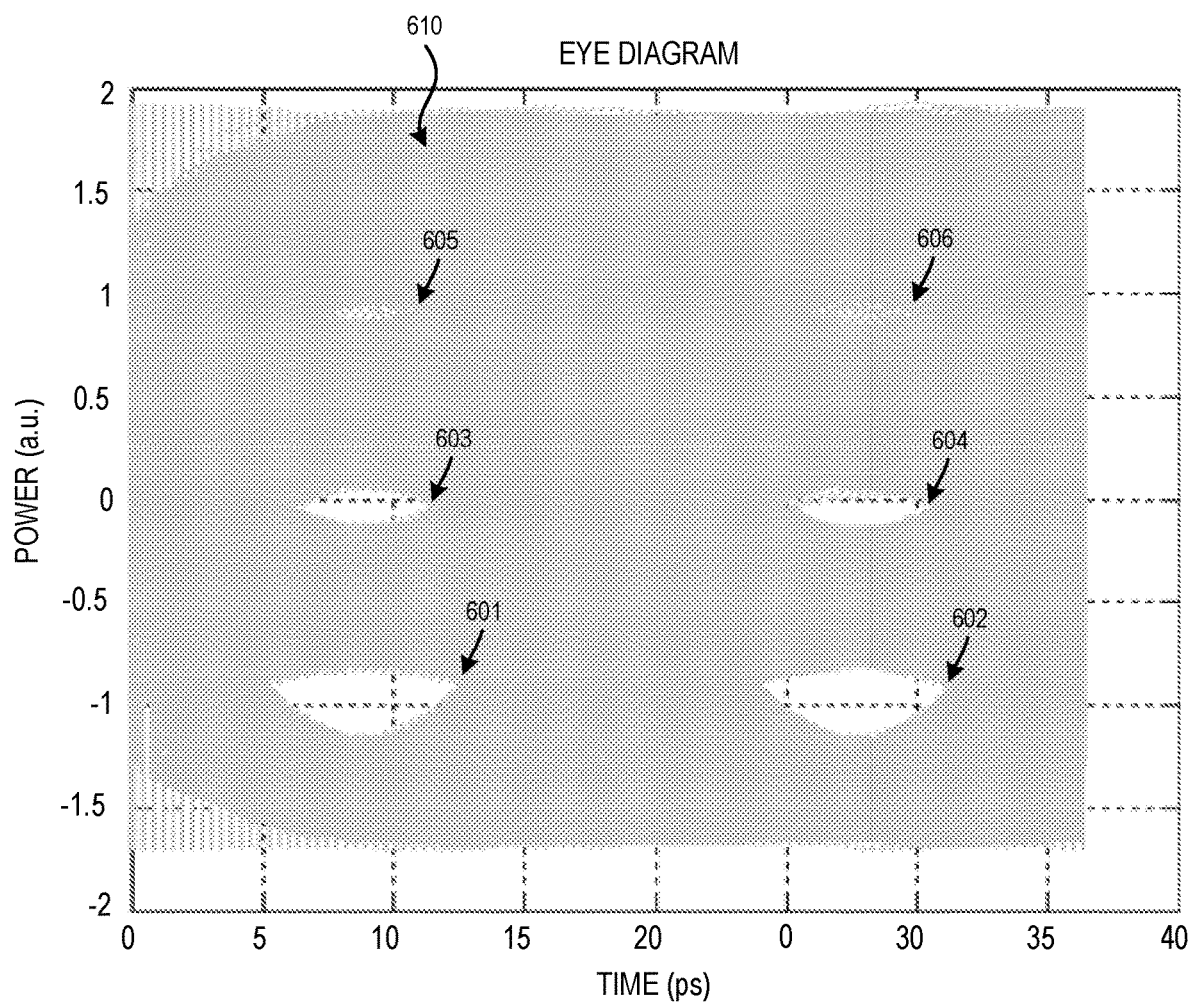
FIG. 6A-6B are eye diagrams of a 4 level pulsed amplitude modulation (PAM4) signal with −26.5 dB MPI in accordance with an embodiment of the present disclosure.
Figure 6B:
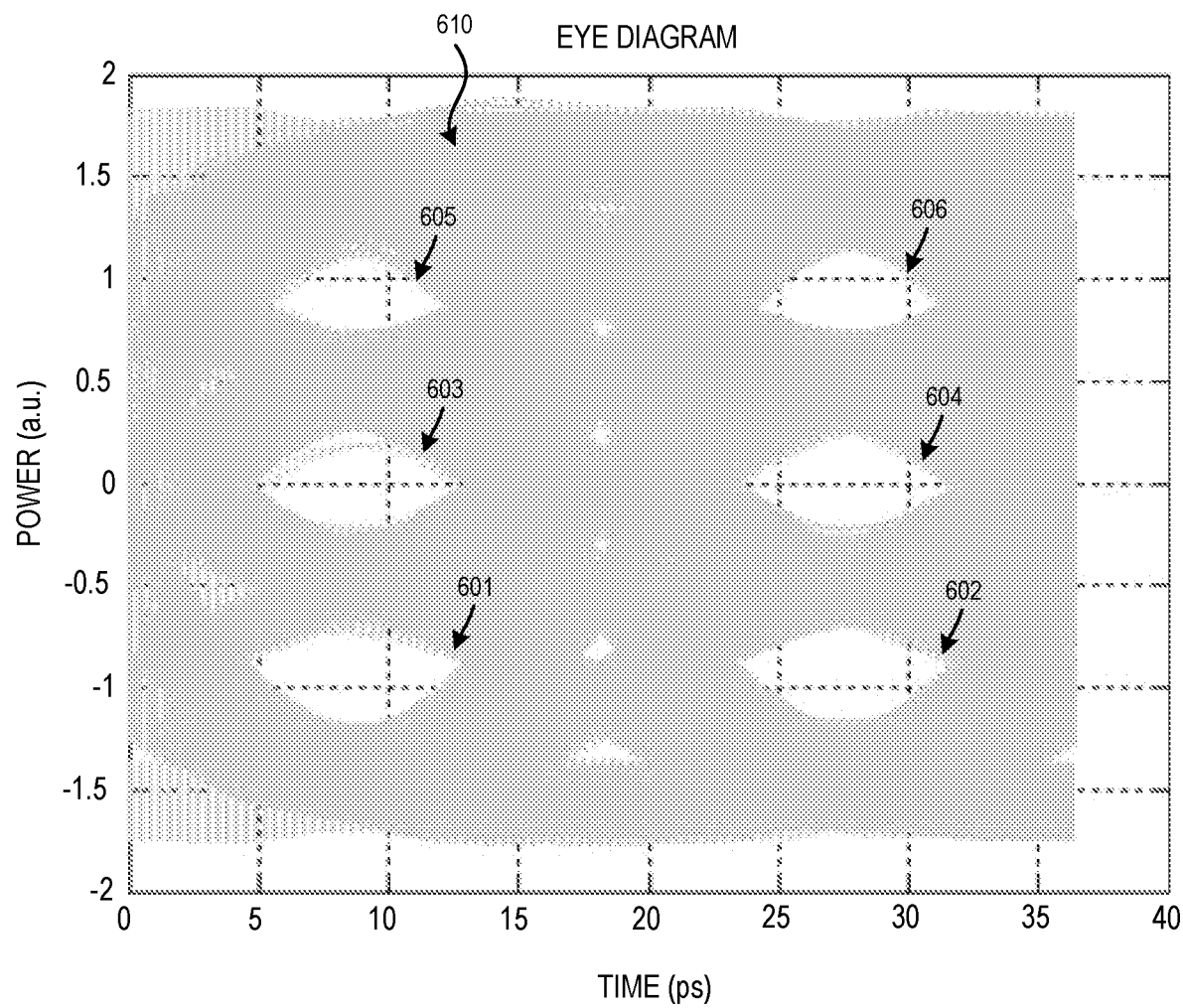

FIGS. 6A-6B are eye diagrams of a PAM4 signal with −26.5 dB MPI in accordance with an embodiment of the present disclosure. An eye diagram is a common indicator of the quality of signals in high-speed digital transmissions. A signal line that suffers from multiple reflections will produce a constrained or stressed "eye" appearance, as indicated generally by eyes 601-606, where the surrounding (shaded) areas 610 are caused by inter-symbol interference due to MPI and finite signal rise/fall time. For instance, FIG. 6A illustrates the eye diagram of PAM4 signal with −26.5 dB MPI and without HPF. It can be seen that the high level eyes 605 and 606 are almost completely closed due to the MPI induced crosstalk, which are signal level dependent and where high level signal suffers more impairment than low level signal. FIG. 6B illustrates the eye diagram of PAM4 signal with −26.5 dB MPI and with HPF ($f_c$=20 MHz) in accordance with an embodiment of the present disclosure. In FIG. 6B, once a HPF with a cut-off frequency of 20 MHz is applied to the distorted signal, the eyes have been significantly opened due to the removal of the carrier-carrier beat noise.

Figure 7A:
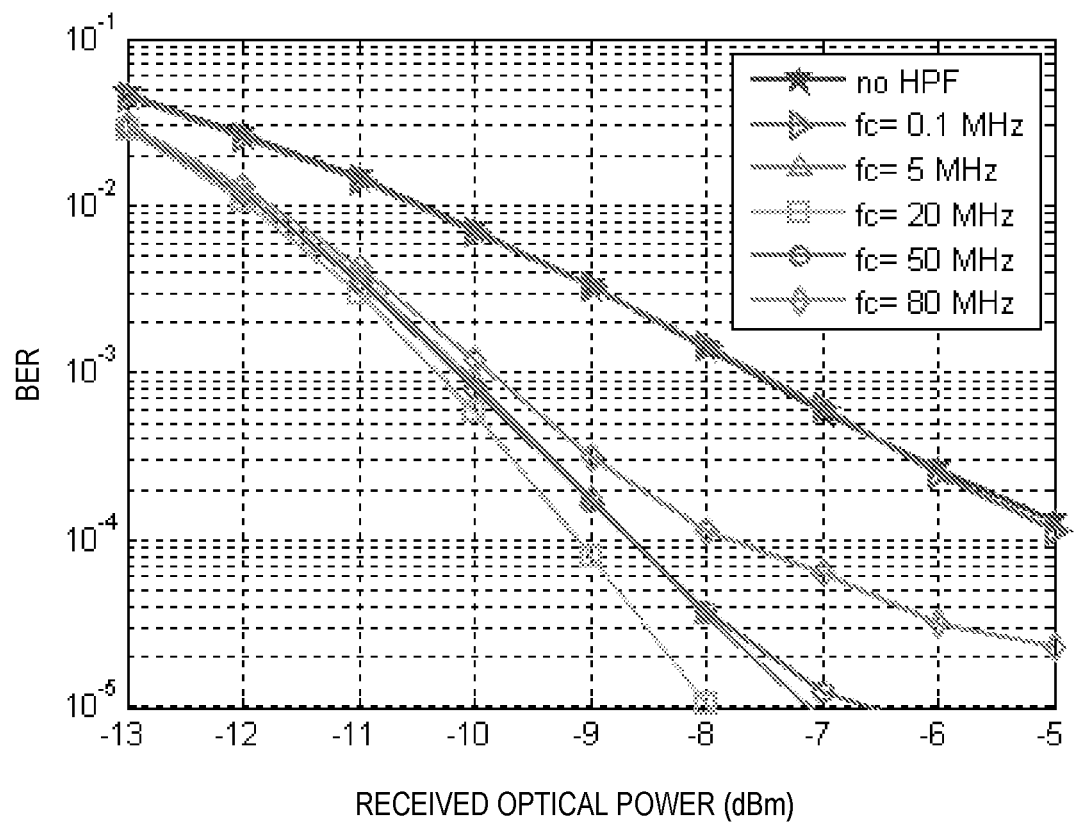
FIGS. 7A-7B are graphs of simulations that illustrate the simulated bit error rate (BER) versus received optical power (ROP), with −26.5 dB MPI, for different HPF cut-off frequencies in accordance with an embodiment of the present disclosure.
Figure 7B:
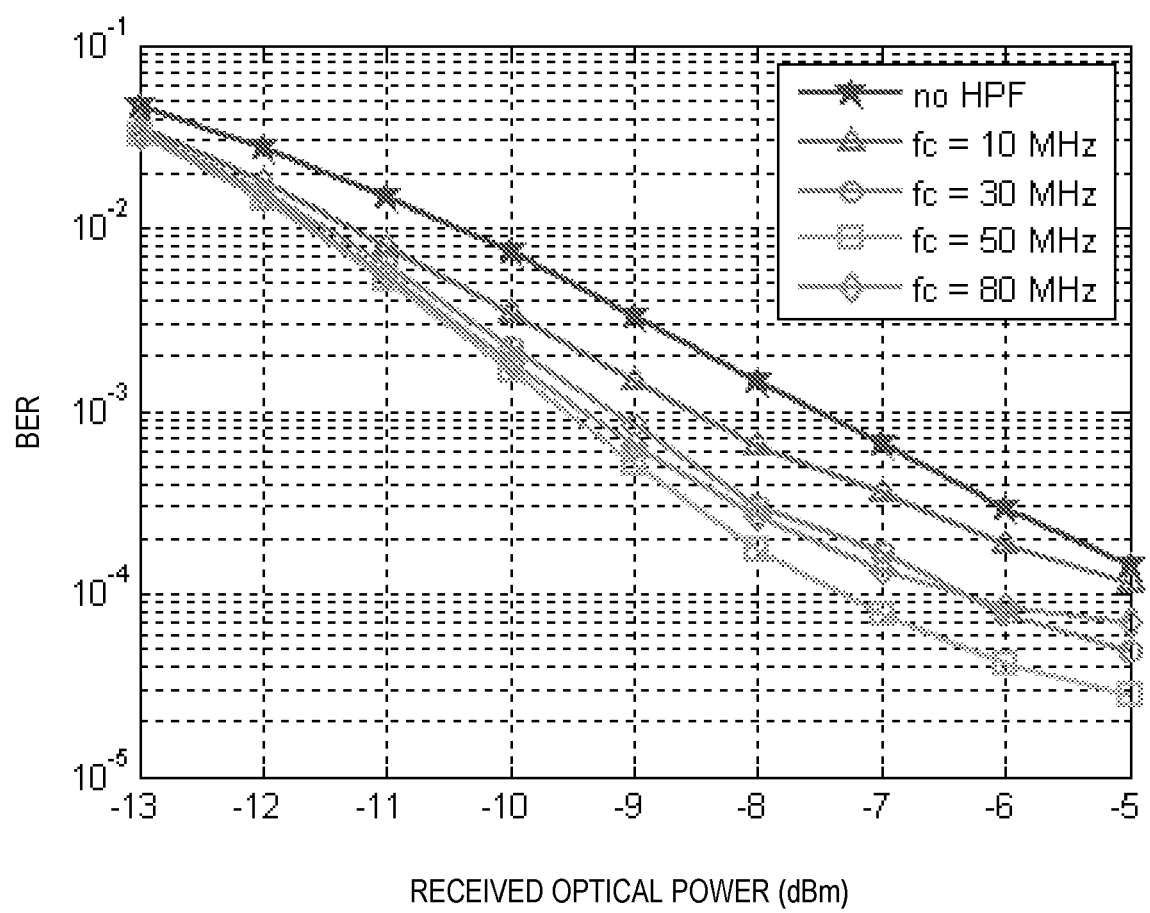

FIGS. 7A-7B are graphs of simulations that illustrate the simulated bit error rate (BER) versus received optical power (ROP), with −26.5 dB MPI, for different HPF cut-off frequencies in accordance with an embodiment of the present disclosure. FIG. 7A is the result for an EML or DFB+MZM transmitter with a typical laser linewidth of 1 MHz. It can be seen that there is almost no performance improvement for HPF cut-off frequency of 100 kHz, so a typical DC block has no effect in removing carrier-carrier beat noise for typical laser linewidth of 1 MHz. The optimal cut-off frequency is around 20 MHz. A HPF with cut-off frequency lower than the optimal value cannot sufficiently suppress the MPI effect, while a HPF with cut-frequency higher than optimal value induces too much distortion due to the cutoff of the useful signal. These simulation results clearly show that the BER performance has been significantly improved by using the disclosed embodiments. FIG. 7B is the result for a DML transmitter with a typical laser linewidth of 10 MHz. The optimal cut-off frequency for this case is about 50 MHz. FIG. 7B illustrates that the BER performance is also improved by using a HPF for 10 MHz linewidth, but the effectiveness is reduced compared with that of 1 MHz linewidth used in FIG. 7A.

Figure 8A:
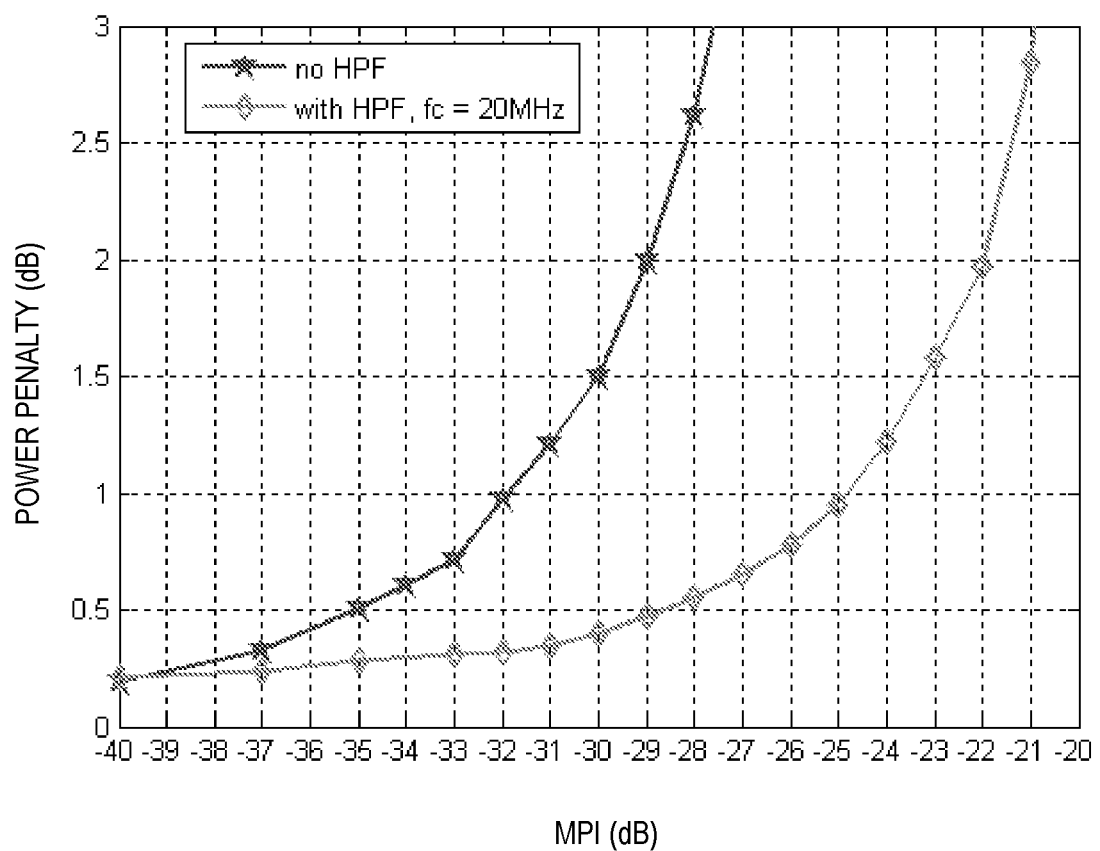
FIGS. 8A-8B are graphs of simulations that illustrate MPI power penalty (i.e., power penalty versus MPI) comparison between scenarios without and with HPF at optimal cut-off frequencies in accordance with an embodiment of the present disclosure.
Figure 8B:
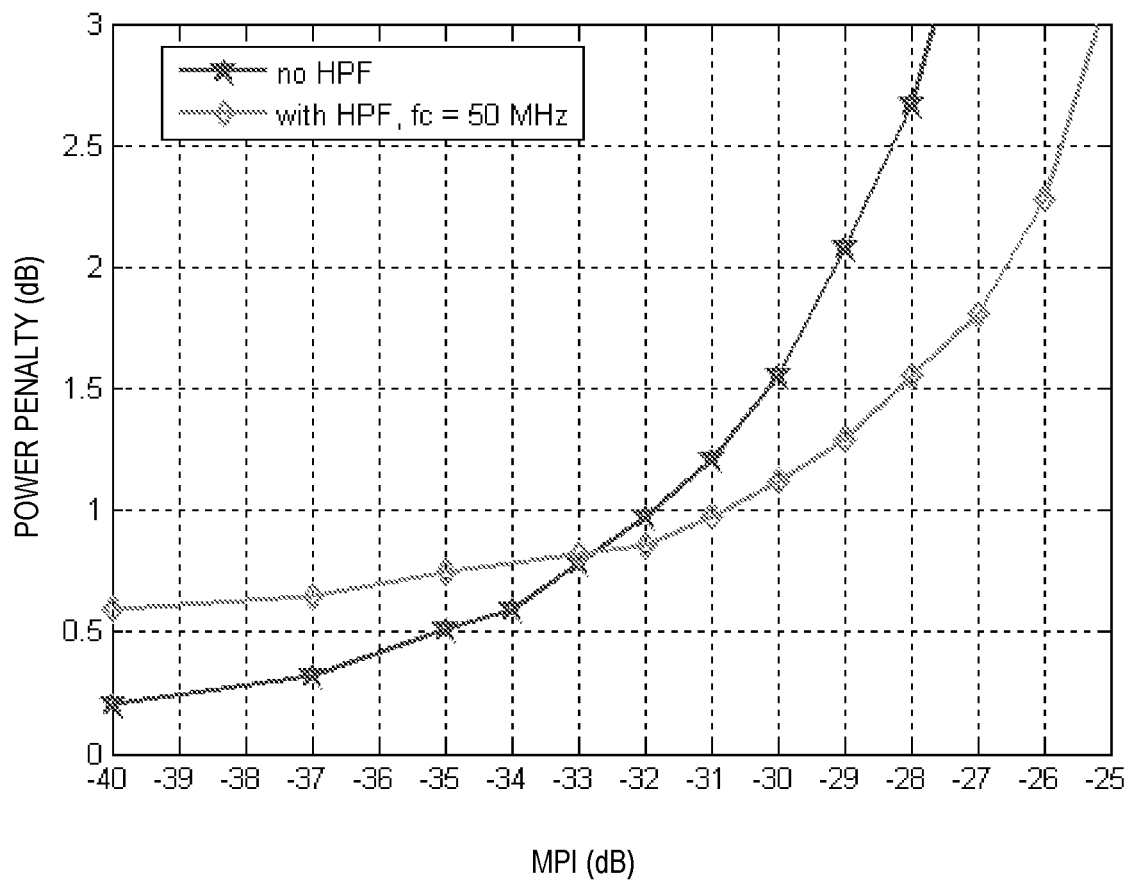

FIGS. 8A-8B are graphs of simulations that illustrate MPI power penalty (i.e., power penalty versus MPI) comparison between scenarios with and without a HPF at optimal cut-off frequencies in accordance with an embodiment of the present disclosure. In the depicted embodiment, the power penalty is referenced to no MPI and no HPF case @2e-4 BER by KP4 FEC. FIG. 8A is for an EML or DFB+MZM transmitter with 1 MHz laser linewidth, with no HPF and with a HPF ($f_c$=20 MHz). With very low level MPI, such as −40 dB, the performance with the HPF is slightly worse than that of without the HPF due to slight filtering penalty. The HPF improves performance when MPI is higher than −39 dB. For 1 dB power penalty, the HPF provides about 7 dB gain in MPI tolerance, corresponding 3.5 dB requirement reduction in connector return loss. FIG. 8B is for a DML transmitter with 10 MHz laser linewidth, with no HPF and with a HPF ($f_c$=50 MHz). Due to significantly broader laser linewidth, the gain in MPI tolerance at 1 dB power penalty is reduced to around 1.0 dB, and the HPF improves performance only when MPI is higher than −32.5 dB.

Figure 9A:
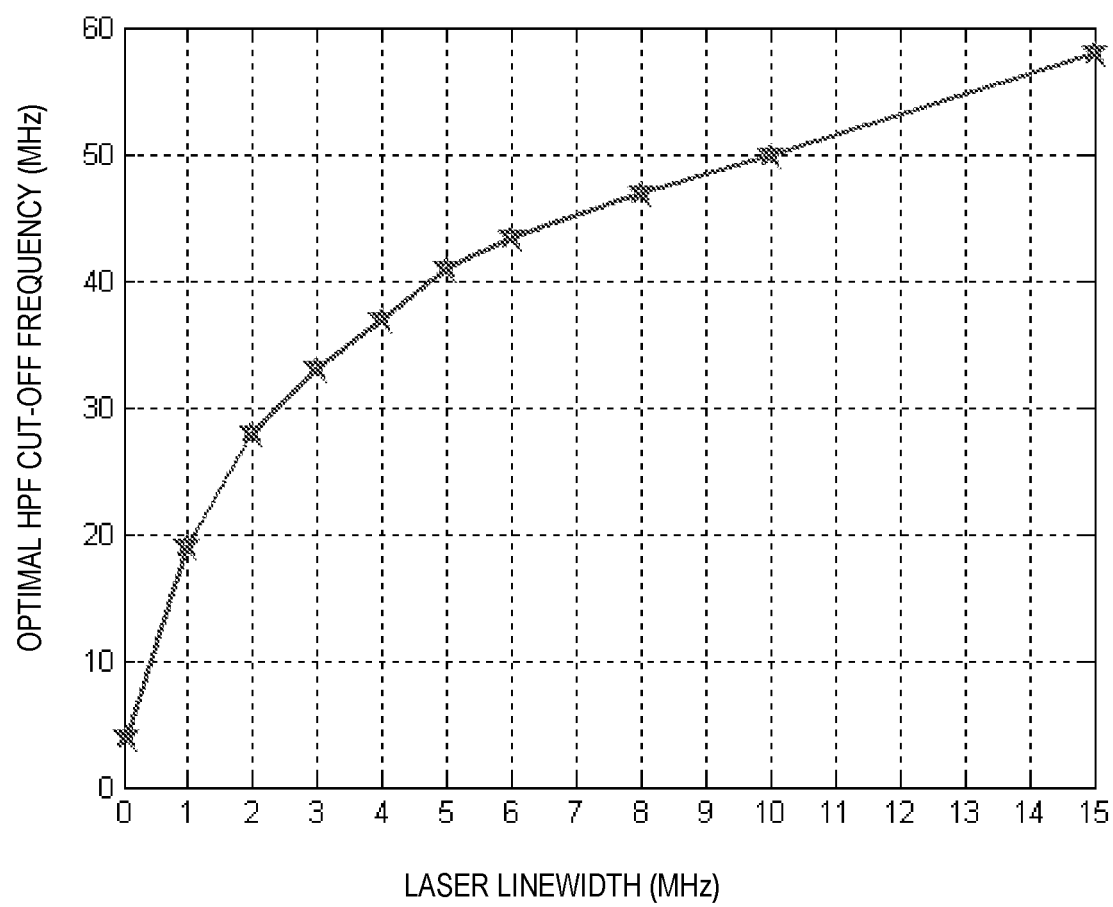
FIGS. 9A-9C are graphs of simulations that illustrate the impact of laser linewidth evaluated at −26.5 dB MPI in accordance with an embodiment of the present disclosure.
Figure 9B:
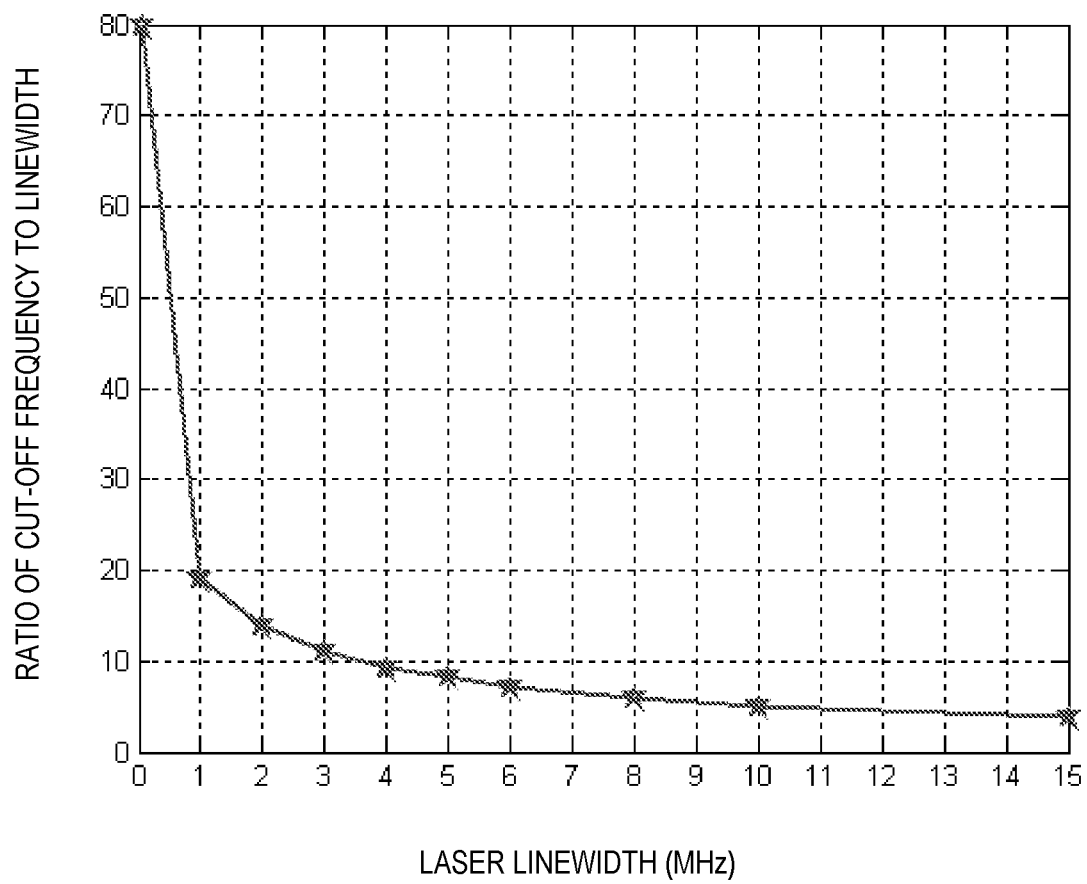
Figure 9C:
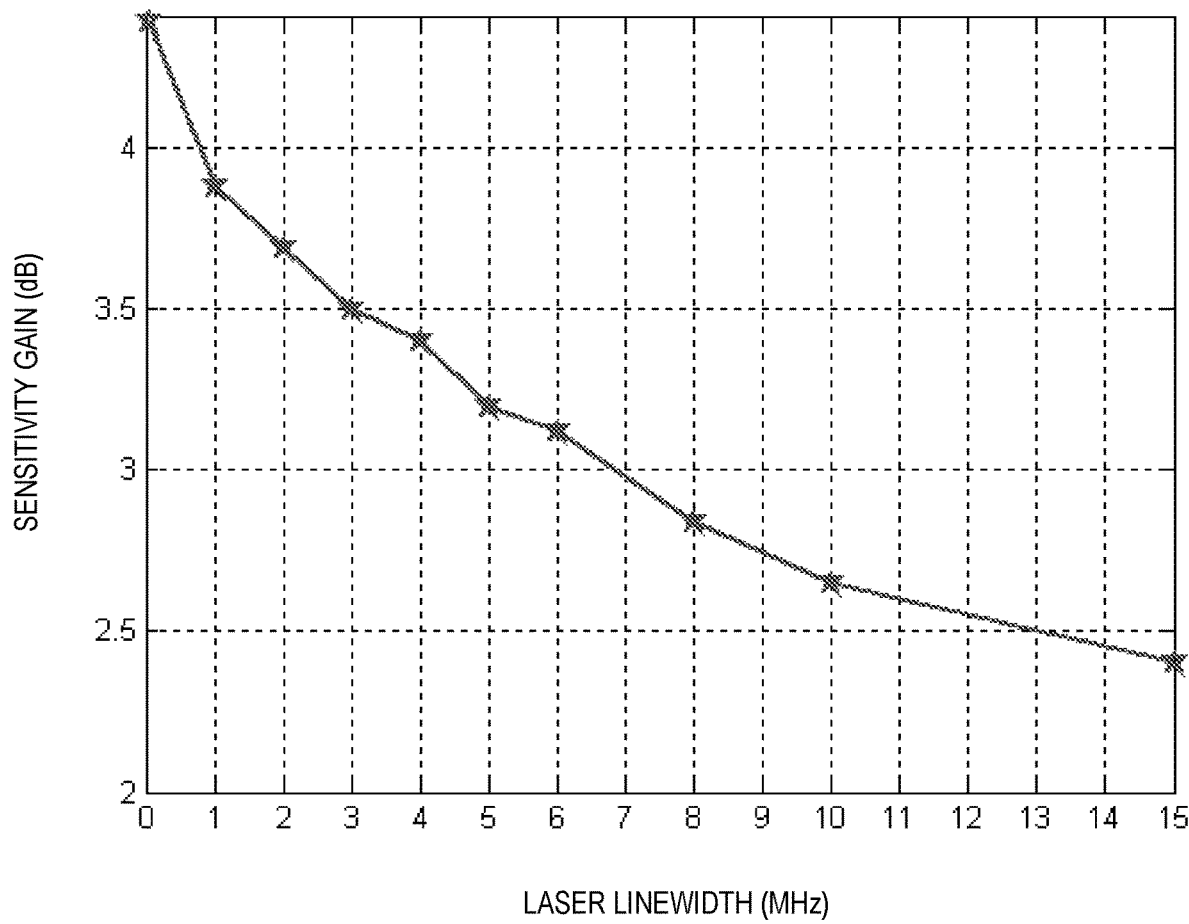

FIGS. 9A-9C are graphs of simulations that illustrate the impact of laser linewidth evaluated at −26.5 dB MPI in accordance with an embodiment of the present disclosure. As shown in FIGS. 9A-9C, the operation and performance using the HPF for MPI mitigation strongly depends on laser linewidth. For instance, FIG. 9A is a graph that illustrates the optimal HPF cut-off frequency as a function of laser linewidth with MPI of −26.5 dB in accordance with an embodiment of the present disclosure. The optimal HPF cut-off frequency increases with the increase of laser linewidth. For a typical EML or DFB+MZM optical transmitters with laser linewidth of 1 MHz, the optimal HPF cut-off frequency is around 20 MHz. For optical transmitters using ECL with linewidth of 50 kHz, the optimal HPF cut-off frequency is around 4 MHz. For a DML optical transmitter with linewidth of 10 MHz, the optimal HPF cut-off frequency is around 50 MHz. In the depicted simulations, the HPF cut-off frequency was confined to the range of 1 MHz-200 MHz.

FIG. 9B is a graph that illustrates the ratio of the optimal HPF cut-off frequency to laser linewidth as a function of laser linewidth in accordance with an embodiment of the present disclosure. As shown, the ratio decreases with the increase of laser linewidth. For optical transmitters using ECL with linewidth of 50 kHz, the ratio is around 80; for a typical EML or DFB+MZM optical transmitters using with linewidth of 1 MHz, the ratio is around 20; and for an optical transmitters using DML with linewidth of 10 MHz, the ratio is around 5. In the depicted simulations, the ratio of the HPF cut-off frequency to laser linewidth was confined to the range of 3~200.

FIG. 9C is a graph that illustrates the sensitivity gain dependence on linewidth in accordance with an embodiment of the present disclosure. In the depicted embodiment, the gain is defined as the sensitivity difference between those with no HPF and those with a HPF at optimal cut-off frequency, @2e-4 BER. As shown in FIG. 9C, sensitivity gain decreases with the increase of linewidth.

Figure 10:
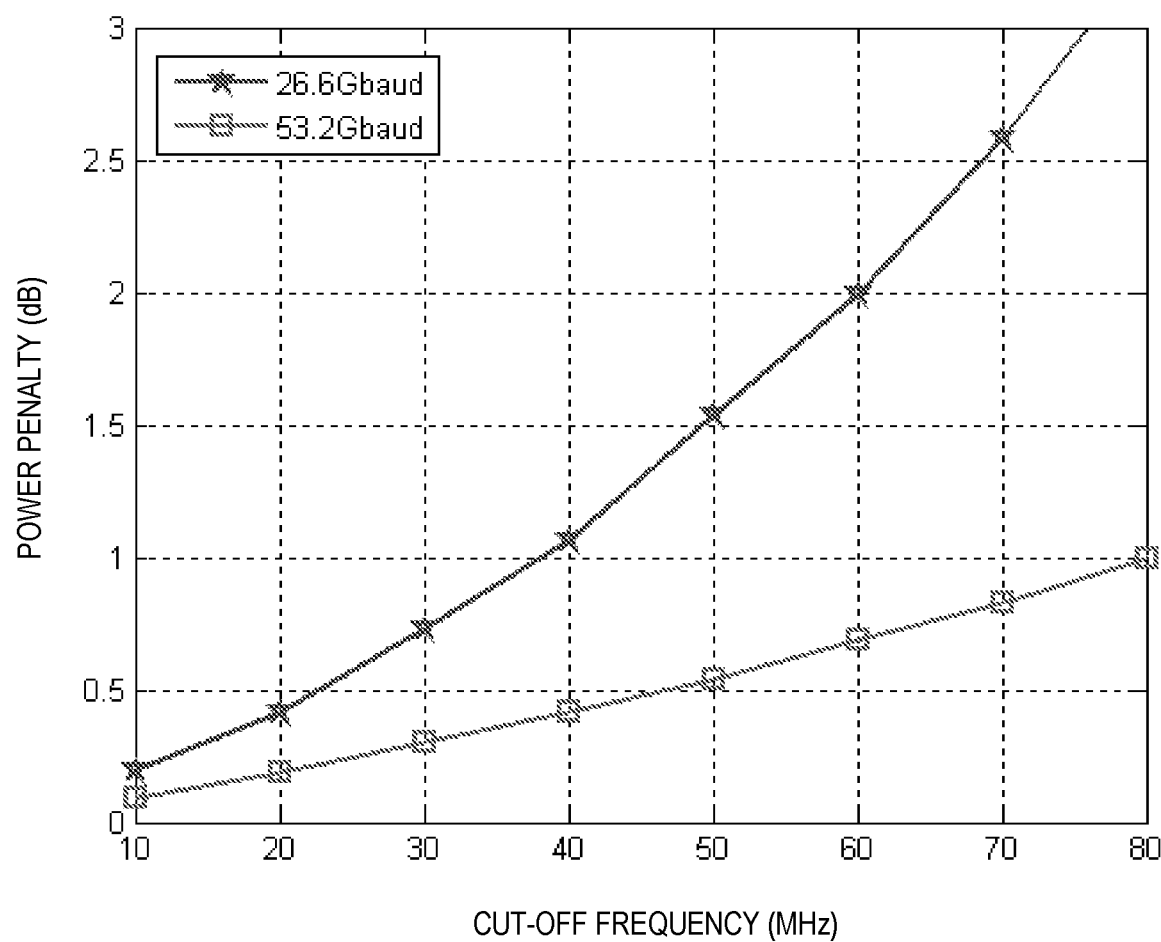
FIG. 10 is a graph illustrating HPF filtering induced power penalty vs. cut-off frequency for different baud rates in accordance with an embodiment of the present disclosure.

FIG. 10 is a graph illustrating the HPF filtering induced power penalty vs. cut-off frequency for different baud rates in accordance with an embodiment of the present disclosure. As previously described, the optimal HPF cut-off frequency is mainly determined by laser linewidth. In addition to removing carrier-carrier beat noise, the HPF also introduces a filtering penalty as discussed in FIGS. 8A-8B. The filtering penalty is dependent on baud rate. Therefore, the optimal cut-off frequency is also related to baud rate. FIG. 10 illustrates the HPF filtering induced power penalty as a function of cut-off frequency for 26.6 Gbuad and 53.2 Gbuad PAM4. The filtering penalty is defined relative to that with no HPF at BER@2e-4. As shown in FIG. 10, the HPF filtering penalty increases with the increase of the HPF cut-off frequency. For instance, for 20 MHz cut-off frequency, the penalty induced by filtering is about 0.2 dB for 53.2 Gbuad PAM4. Lower baud rate suffers higher HPF filtering penalty than that of high baud rate.

Figure 11A:
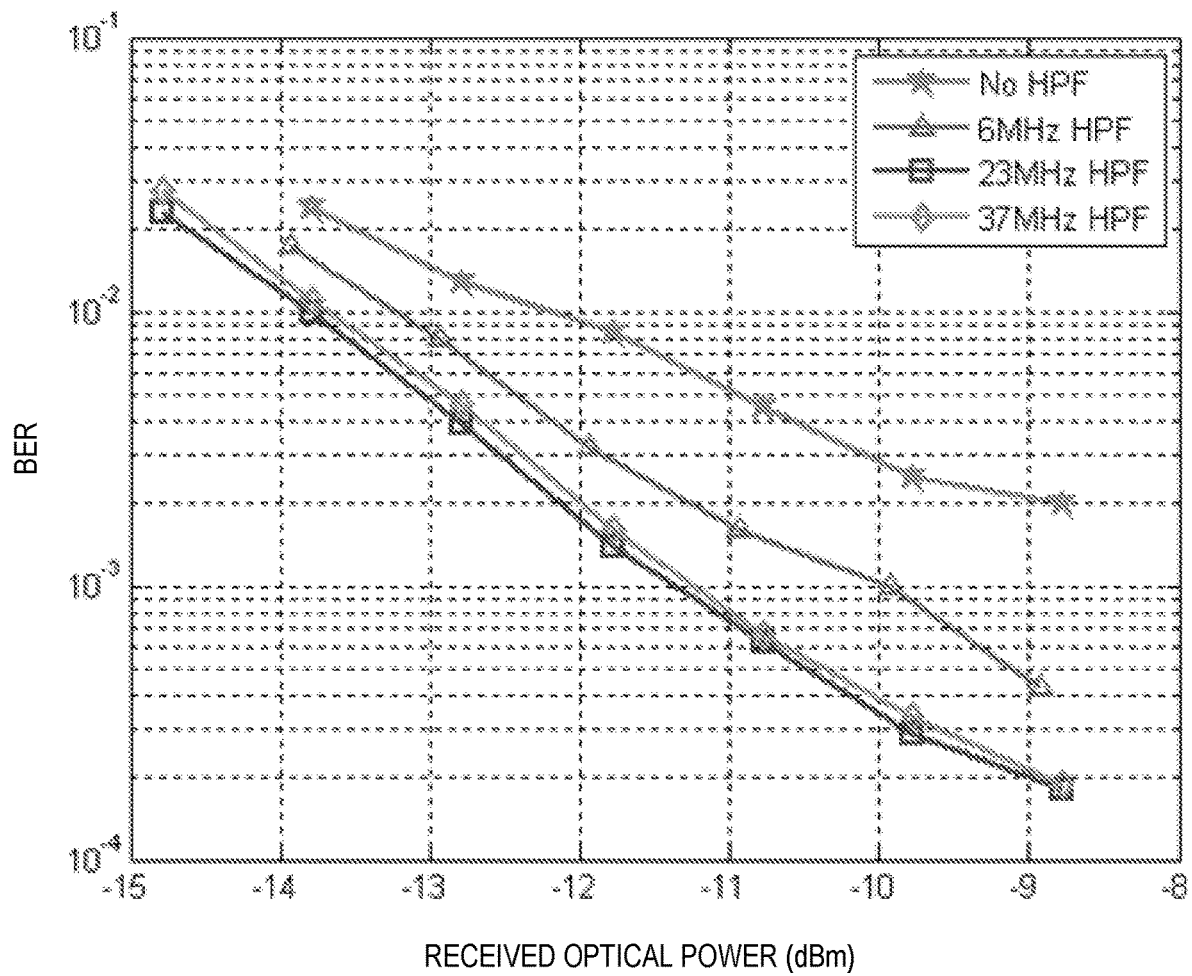
FIGS. 11A-11B are graphs that illustrate BER vs. ROP for 26.6 Gbaud PAM4 with different HPF cut-off frequencies in accordance with an embodiment of the present disclosure.
Figure 11B:
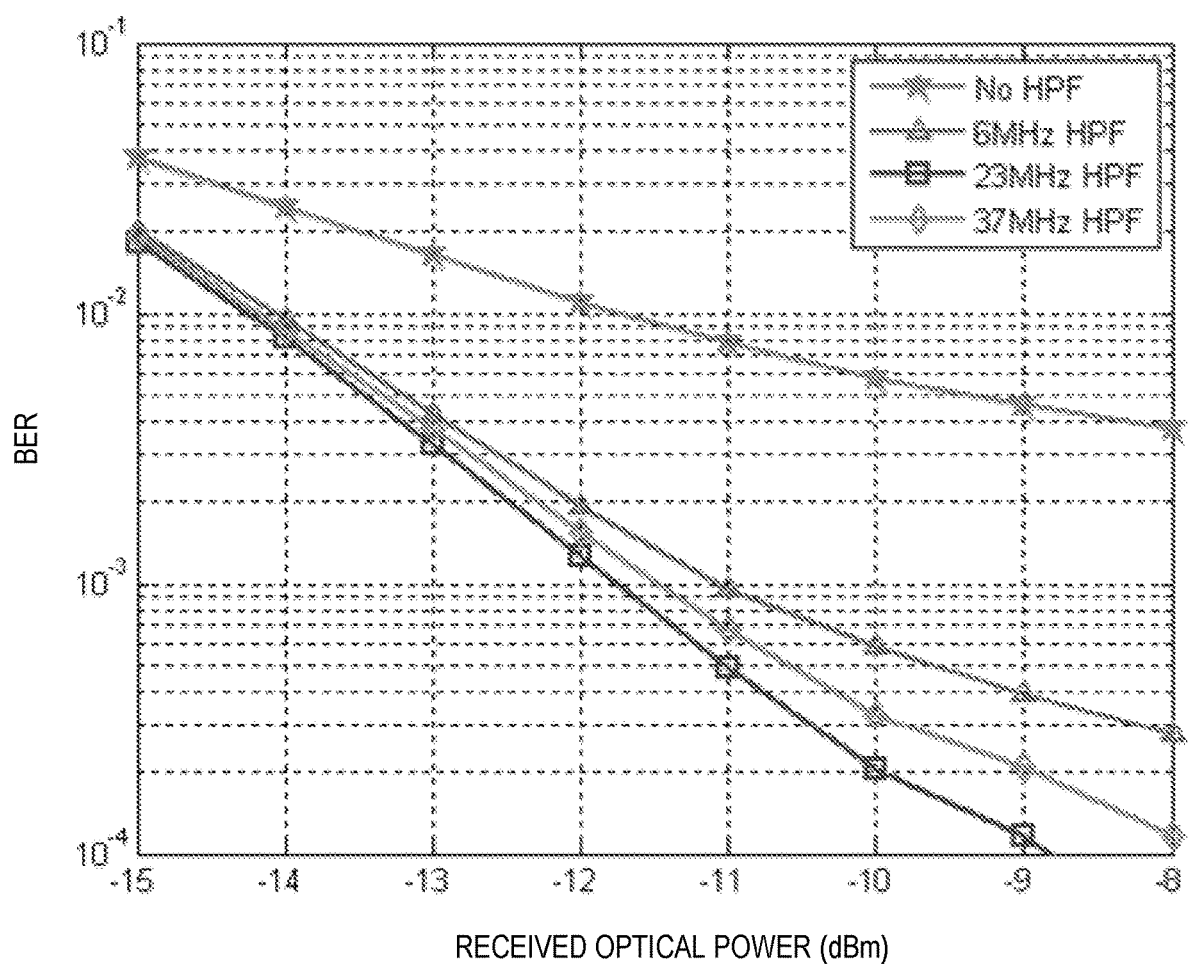

FIGS. 11A-11B are graphs that illustrate BER vs. ROP for 26.6 Gbaud PAM4 with different HPF cut-off frequencies in accordance with an embodiment of the present disclosure. In particular, FIG. 11A illustrates the BER versus received optical power (ROP) for 26.6 Gbaud PAM4 with −26.5 dB MPI results of an experiment (i.e., a physical build as opposed to a software simulation) using three HPF cut-off frequencies, 6 MHz, 23 MHZ and 37 MHz. The experiment operated at 26.6 Gbaud since only a 25 Gbaud (rather than 50 Gbaud) optical receiver was available for evaluation. All HPFs provided improved BER performance compared to that with no HPF, indicating the effectiveness of the disclosed embodiments. In the depicted embodiment, 23 MHz HPF provides the optimal performance. Simulation (i.e., a software model) at 26.6 Gbaud PAM4 was also run for comparison, as shown in FIG. 11B. The simulation results exhibit more effectiveness in MPI suppression when using HPF than the experiment results in FIG. 11A. Similar to the experiment results in FIG. 11A, the simulation results in FIG. 11B illustrates that 23 MHz HPF filtering provides better performance than those with 6 MHz and 37 MHz cut-off frequencies.

Figure 12:
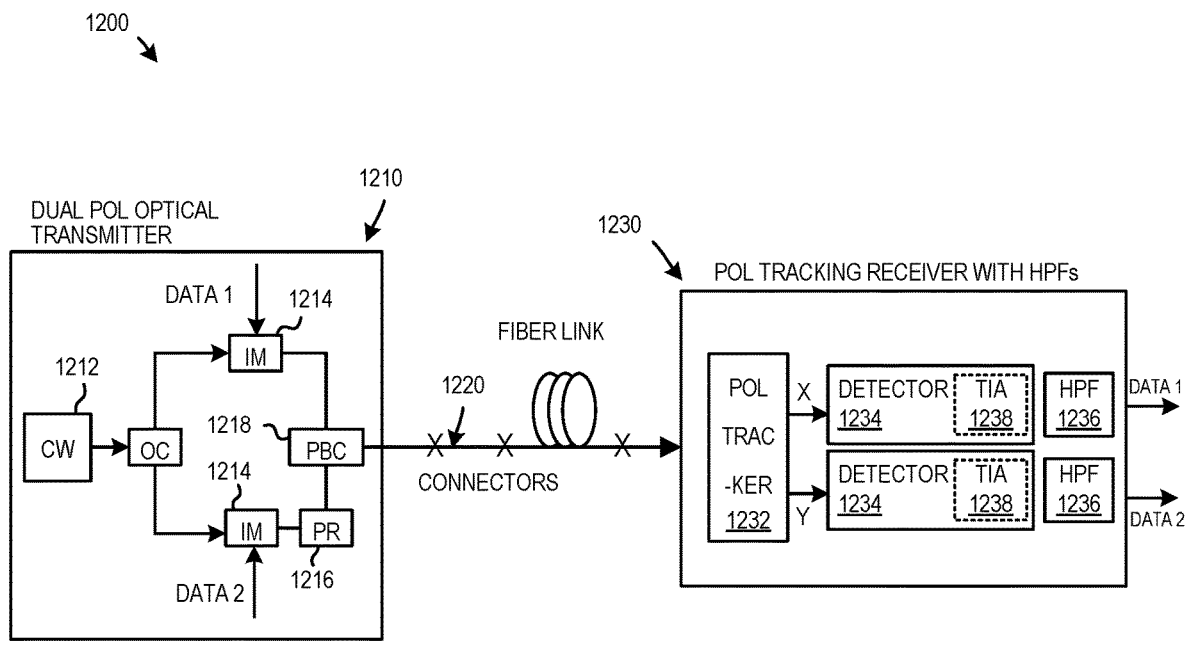
FIG. 12 is a schematic drawing illustrating a polarization-division multiplexing (PDM) fiber system in accordance with an embodiment of the present disclosure.

FIG. 12 is a schematic drawing illustrating a polarization-division multiplexing (PDM) fiber system 1200 in accordance with an embodiment of the present disclosure. The PDM fiber system 1200 includes a dual polarization optical transmitter 1210, a fiber link 1220 that experiences multipath interference, and a polarization tracking optical receiver 1230 with two HPFs for MPI mitigation. In the depicted embodiment, the dual polarization optical transmitter 1210 uses a CW light 1212 as input into an optical coupler (OC) which separates the light in two parts. Each part is launched into an intensity modulator (IM) 1214, such as MZM, for data modulation. The two modulated lights, with one of them rotated by 90 degrees in polarization via a polarization rotator (PR) 1216, are combined by a polarization beam combiner (PBC) 1218. The output is the polarization multiplexed channel and is launched into the fiber link 1220, which is the same as that of FIG. 4. After the fiber link 1220, the dual polarization channel with MPI is launched into the polarization tracking optical receiver 1230 with HPFs. In the depicted embodiment, the polarization tracking optical receiver 1230 includes a polarization tracker 1232, two detectors 1234, and two HPFs 1236. The detectors 1234 can each include an optional TIA 1238. The polarization tracker 1232 receives the dual polarization signal and demultiplexes it into two channels (X and Y) in optical domain. In an embodiment, the polarization tracker 1232 may be an endless polarization controller which can be automatically controlled, and may be integrated in a silicon photonics platform. Each demultiplexed channel is input into a detector 1234 for optical to electrical conversion and then electrical signal amplification. The electrical signal then passes through a HPF 1236 for MPI mitigation. The electrical output signal of the polarization tracking optical receiver 1230 is fed to either a DSP after analog to digital conversion or decision circuits.

Figure 13:
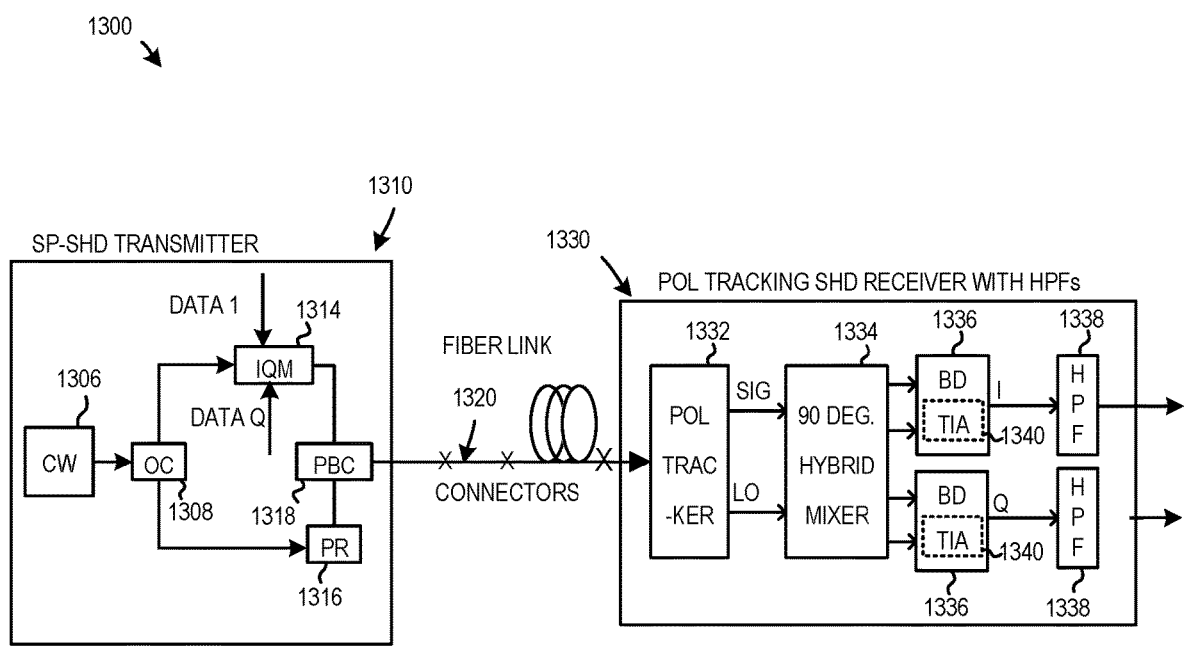
FIG. 13 is a schematic drawing illustrating a single polarization (SP) self-homodyne detection (SHD) transmission system in accordance with an embodiment of the present disclosure.

FIG. 13 is a schematic drawing illustrating a single polarization (SP) self-homodyne detection (SHD) transmission system 1300 in accordance with an embodiment of the present disclosure. The SP-SHD 1300 includes a SP-SHD transmitter 1310, a MPI impaired fiber link 1320, and polarization tracking SHD receiver 1330 having two HPFs for MPI mitigation. In the SP-SHD transmitter 1310, a CW light 1306 is input into an OC 1308 of the SP-SHD transmitter 1310 which separates the light in two parts. The first part is launched into a modulator 1314, such as a single polarization IQ modulator (SP-IQM), for data modulation. The second part passes through the waveguide without modulation, to function as a pilot or carrier, and is combined with the modulated light by a PBC 1318, with one of them rotated by 90 degrees in polarization via a PR 1316. The output consists of a signal and a carrier having polarization orthogonal to each other. The SP-SHD channel is launched into the fiber link 1320, which is the same as that of FIG. 4.

After the fiber link 1320 transmission, SP-SHD channel experiences MPI and is sent into the polarization tracking SHD receiver 1330 with HPFs. In the depicted embodiment, the polarization tracking SHD receiver 1330 includes a polarization tracker 1332, a 90 degree optical hybrid mixer 1334, two balanced detectors (BDs) 1336, and two HPFs 1338. In an embodiment, each of the BDs 1336 include an option TIA 1340. The polarization tracker 1332 receives SP-SHD channel with MPI and separates the signal and pilot, where the latter is used as a local oscillator (LO). The LO and signal are input into the 90 degree optical hybrid mixer 1334 to generate 4 outputs, with two outputs (I positive and I negative) sent into a first BD 1336 to generate and amplify the recovered in-phase (I) data and the other two outputs (Q positive and Q negative) sent to the second BD 1336 to generate and amplify the recovered quadrature (Q) data. I and Q channels are input into their respective HPFs 1338 to mitigate the MPI effect. The electrical signal from each of the HPFs 1338 is then passed to a coupled TIA 1340, which amplifies the electrical signal. The electrical output signal of the polarization tracking optical receiver 1330 is fed to either a DSP after the analog to digital conversion or decision circuits.

In all the above discussed embodiments, the HPF is implemented in analog domain. If there is no receiver DSP, the HPF can be located after the detector and before decision circuit. If there is DSP at receiver side, the HPF can be located after the detector and before the analog to digital convertor. For the scenarios with DSP at receiver side, the HPF can be also implemented in digital domain, where the digital HPF is located after the analog to digital convertor. The HPF filter tap number could be very long due to the fact that the cut-off frequency is in MHz scale, which is very low compared with DSP sampling rate. In some embodiments multi-stage moving average filters can be introduced with sampling rate conversion to reduce the number of filter tap.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical receiver comprising:
an input port configured to receive an intensity modulated optical signal with multipath interference (MPI);
a detector configured to convert the intensity modulated optical signal with MPI to an electrical signal;
a high pass filter (HPF) configured to filter the electrical signal and suppress carrier-carrier beat noise induced by the MPI to produce a filtered electrical signal, wherein the HPF introduces a filtering penalty that is dependent on a baud rate used in modulating data in the intensity modulated optical signal received by the optical receiver; and
an output port configured to transmit the filtered electrical signal.

2. The optical receiver of claim 1, further comprising a transimpedance amplifier (TIA) located downstream of the HPF and configured to amplify the filtered electrical signal.

3. The optical receiver of claim 1, wherein the HPF is a resistor-capacitor (RC) HPF having a surface mount capacitor on a micro-stripe transmission line.

4. The optical receiver of claim 1, wherein a frequency transfer function of the HPF is $$H(f) = \frac{V_{out}}{V_{in}} = \frac{jf/f_c}{1 + jf/f_c},$$

wherein f is a frequency and j is a unit imaginary number, and wherein $$f_C = \frac{1}{2\pi RC}$$

is a cut-off frequency.

5. The optical receiver of claim 1, wherein the HPF is a direct component (DC) block with a capacitor having a cut-off frequency $$f_C = \frac{1}{2\pi RC}.$$

6. The optical receiver of claim 1, wherein the intensity modulated optical signal with MPI uses pulse amplitude modulation n (PAMn) as a baseband modulation, and wherein n is an integer equal to or greater than two.

7. The optical receiver of claim 1, wherein the intensity modulated optical signal with MPI uses one of a carrierless amplitude phase (CAP) modulation, quadrature amplitude modulation (QAM), or discrete multiple tone (DMT) as a subcarrier modulation.

8. The optical receiver of claim 1, wherein a cut-off frequency of the HPF increases with an increase of a laser linewidth used in transmitting the intensity modulated optical signal to the optical receiver.

9. The optical receiver of claim 1, wherein the MPI is generated in a fiber link coupled to the input port of the optical receiver.

10. An optical receiver comprising:
an input port configured to receive an intensity modulated optical signal with multipath interference (MPI);
a detector configured to convert the intensity modulated optical signal with multipath interference to an electrical signal;
a high pass filter (HPF) configured to filter the electrical signal and suppresses low frequency components induced by the MPI to produce a filtered electrical signal, wherein the HPF is a resistor-capacitor (RC) HPF with a surface mount capacitor on a microstrip transmission line or the HPF is an existing direct component (DC) block with a replacement capacitor, and wherein the HPF has a cut-off frequency in a range of 20 megahertz (MHz) to approximately 200 MHz;
an output port configured to transmit the filtered electrical signal; and
a transimpedance amplifier (TIA) configured to amplify the electrical signal.

11. The optical receiver of claim 10, wherein a frequency transfer function of the HPF (106) is $$H(f) = \frac{V_{out}}{V_{in}} = \frac{jf/f_c}{1 + jf/f_c},$$

wherein f is a frequency and j is a unit imaginary number, and wherein $$f_C = \frac{1}{2\pi RC}$$

is the cut-off frequency.

12. The optical receiver of claim 10, wherein the intensity modulated optical signal with MPI uses pulse amplitude modulation n (PAMn) as a baseband modulation, and wherein n is an integer equal to or greater than two.

13. The optical receiver of claim 10, wherein an optimal cut-off frequency of the HPF increases with an increase of a laser linewidth used in transmitting an intensity modulated optical signal to the optical receiver.

14. The optical receiver of claim 10, wherein the MPI is generated in a fiber link coupled to the input port of the optical receiver.

15. The optical receiver of claim 10, wherein the HPF introduces a filtering penalty that is dependent on a baud rate used in modulating data in the intensity modulated optical signal received by the optical receiver.

* * * * *